US007192985B2

(12) United States Patent
Woods

(10) Patent No.: US 7,192,985 B2

(45) **Date of Patent: *Mar. 20, 2007**

(54) MORE CONTROLLABLE ACOUSTIC SPRAY PATCH

(75) Inventor: John R. Woods, Woodland Hills, CA (US)

(73) Assignee: Spraytex, Inc., Valencia, CA (US)

( * ) Notice: Subject to any disclaimer, the term of this patent is extended or adjusted under 35 U.S.C. 154(b) by 335 days.

This patent is subject to a terminal disclaimer.

(21) Appl. No.: 10/696,983

(22) Filed: Oct. 30, 2003

(65) Prior Publication Data

US 2004/0099697 A1 May 27, 2004

Related U.S. Application Data

(62) Division of application No. 09/746,447, filed on Dec. 6, 2000, now Pat. No. 6,641,864, which is a division of application No. 09/375,840, filed on Aug. 16, 1999, now abandoned.

(51) Int. Cl.

| | |
|---|---|
| ***B01F 17/00*** | (2006.01) |
| ***B01F 3/04*** | (2006.01) |
| ***C09K 3/10*** | (2006.01) |
| ***C09K 3/30*** | (2006.01) |
| ***E04B 9/00*** | (2006.01) |
| *B05B 7/30* | (2006.01) |

(52) U.S. Cl. ...................... 516/11; 52/309.16; 52/344; 52/506.1; 156/60; 222/402.1; 239/346

(58) Field of Classification Search .................... 516/8, 516/11

See application file for complete search history.

(56) References Cited

U.S. PATENT DOCUMENTS

| | | | | |
|---|---|---|---|---|
| 3,846,364 | A | 11/1974 | Criddle et al. | |
| 4,005,038 | A | 1/1977 | Minkoff | |
| 4,194,026 | A | 3/1980 | Goodale | |
| 4,450,253 | A * | 5/1984 | Suk | 524/378 |
| 4,472,201 | A * | 9/1984 | Ochi et al. | 106/706 |
| 5,341,970 | A | 8/1994 | Woods | |
| 5,474,804 | A | 12/1995 | Kubic | |
| 5,476,879 | A | 12/1995 | Woods | |
| 5,500,456 | A * | 3/1996 | Hughett et al. | 523/166 |
| 5,505,344 | A | 4/1996 | Woods | |
| 5,914,196 | A | 6/1999 | Calvo et al. | |
| 6,797,051 | B2 * | 9/2004 | Woods | 106/802 |

* cited by examiner

*Primary Examiner*—Randy Gulakowski
*Assistant Examiner*—Timothy J. Kugel
(74) *Attorney, Agent, or Firm*—Pillsbury Winthrop Shaw Pittman LLP

(57) ABSTRACT

A more controllable acoustic ceiling patch or textured material in the form of a sprayable composition includes a base, a filler, an adhesive binder, an anti-foaming agent, a suspension agent, and rubber particulates or polyethylene particulates forming an aggregate suitable for spraying in the presence of volatile organic compound (VOC) propellants without melting or deterioration. The more controllable acoustic ceiling patch is storable and dispensable from a pressurized dispenser having a delivery nozzle. An aerosol system with a spray nozzle is included on the container for selective discharge of the textured material onto a prepared patch area, which may be on a drywall or support panel so as to match and blend with the surrounding acoustic ceiling surface area in order to provide a continuous and unbroken coextensive surface texture of mechanically and visually matched material.

22 Claims, 1 Drawing Sheet

15
14
13
18
10
17
16

MORE CONTROLLABLE ACOUSTIC SPRAY PATCH

This application is a divisional of Ser. No. 09/746,447, now U.S. Pat. No. 6,641,864, entitled "More Controllable Acoustic Spray Patch Composition," filed Dec. 6, 2000, which is a divisional of U.S. patent application Ser. No. 09/375,840, entitled "More Controllable Acoustic Spray Patch Compositions," field Aug. 16, 1999, now abandoned, both of which are herein incorporated by reference.

BACKGROUND OF THE INVENTION

The present invention relates to surface texture materials, and more particularly to a novel pressurized substance in liquid or semi-liquid form that is storable and dispensable from an air-tight pressurized container to be sprayed onto a drywall or supporting surface so that after subsequent curing and hardening, a matching texture surface is provided with that of surrounding acoustic ceiling areas.

It has been the conventional practice in the procedure of repairing drywall or patching acoustic ceiling areas to remove the damaged portion of the ceiling and subsequently fill any holes, depressions, or the like with a prepared patch material. The patch or replacement material is applied by means of a trowel or other flat tool that will press the patch material into the hole or depression and that will prepare and provide a surface area to receive a finish surface coating. After the patch material has cured and adhered to the original support material, a smooth surface is provided that receives the final coating. This coating leaves a smooth surface that is not matched to the surrounding roughened or textured surface.

An acoustic ceiling surface usually presents a surface texture that is bumpy or presents an irregular look and sometimes is referred to as a "Popcorn effect". Such an appearance and surface texture cannot be attained through the use of smoothing tools or patch tools once the patch material has been applied to the damaged or repaired area. Therefore, difficulties and problems have been encountered that stem largely from the fact that the use and application of conventional patching materials on acoustic ceiling repairs leaves a surface texture that does not match the surrounding area and is noticeable after the repair has been completed.

U.S. Pat. Nos. 5,505,344, 5,476,879, and 5,341,970, all to the present Applicant, disclose an acoustic ceiling patch that is sprayable from a hand-held aerosol dispense. However, certain materials, such as STYROFOAM, used as an aggregate in the acoustic ceiling patch to provide texture in the material, cannot be used in the presence of volatile organic compound (VOC) propellants because they will deteriorate or melt. Therefore, only non-VOC propellants or compressed air may be used with these aggregate materials. However, the use of non-VOC propellants or compressed air require a greater pressure to dispense the patch material containing these aggregates. The greater pressure may lead to some loss of control for the user when spraying the patch material. Along with the use of a greater pressure to dispense the patch material is the decrease in atomization of the patch material when being dispensed.

Therefore, there is a need for an acoustic ceiling patch material that may be applied to a repaired or patched area, and that may be contained in a hand-held applicator and dispensed, using VOC propellants, requiring only one hand, so that the material may be conveniently stored as well as applied to the repaired area in a simple and convenient manner.

SUMMARY OF THE INVENTION

An object of an embodiment the present invention is to provide an acoustic ceiling spray patch material that is storable and dispensable from a hand-held dispensing unit for spray-on and direct application of the material in a liquid or semi-liquid form onto a repaired or patched area so that the surrounding surface texture will be visually and mechanically matched.

Another object of an embodiment of the present invention is to provide an inexpensive, practical and economical means for matching the surface texture of a repaired or patched surface area on an acoustic ceiling with the surrounding acoustic surface texture.

Another object of an embodiment of the present invention is to improve the appearance of acoustic ceiling patched or repaired areas on a ceiling surface by employing a spray-on textured material that covers the patched or repaired areas and visually assumes the surface texture of the surrounding acoustic ceiling surface.

Another object of an embodiment of the present invention is to provide a more controllable acoustic patch spray that does not require a high build-up of pressure in order to propel the patch material.

A further object of an embodiment of the present invention is to provide a particulate for use as an aggregate in the more controllable acoustic patch spray that will not disintegrate or melt upon spraying in the presence of volatile organic compound (VOC) propellants.

Accordingly, the above problems and difficulties are obviated by the present invention, which provides a novel material that is storable and dispensable from a convenient dispenser including a pressurized container holding a quantity of the acoustic ceiling surface texture material in a liquid or semi-liquid condition so that upon depression of a dispensing nozzle, the material will be discharged and directed to a patch area intended to receive the surface texture material. The hardenable flowable material includes a base, a filler, an adhesive binder, an aggregate, made of rubber particulates or polyethylene particulates, that does not decompose in the presence of VOC propellants, an anti-foaming agent, a suspension agent, and an aerosol propellant, preferably a VOC propellant, that serves as a carrier medium and a pressure source so that the hardenable flowable material may be applied by spray and will adhere to the repaired patch and drywall surface.

In an embodiment of the present invention, the acoustic ceiling textured material may include: a base or emulsion of water and/or solvent; an adhesive binder made of a natural or synthetic polymer; a pressurized carrier for dispensing of the material, such as a solvent/propellant aerosol that mixes with the composition; a filler made of a mixture of calcium-carbonate (limestone), mica, or clay; an aggregate having rubber particulates or polyethylene-type particulates (that are not dissolvable in solvent or solvent propellants, such as dimethyl ether (DME), propane, or butane) resembling the STYROFOAM used in the conventional methods that help produce the "Popcorn effect". Furthermore, the rubber or polyethylene particulates, being of a soft and deformable material, allow for an easier flow through the valves and nozzles of the dispensing container because they are deformable and bend within the valves and nozzles upon dispensing.

DESCRIPTION OF THE PREFERRED EMBODIMENT

Figures 1, 2, 3:
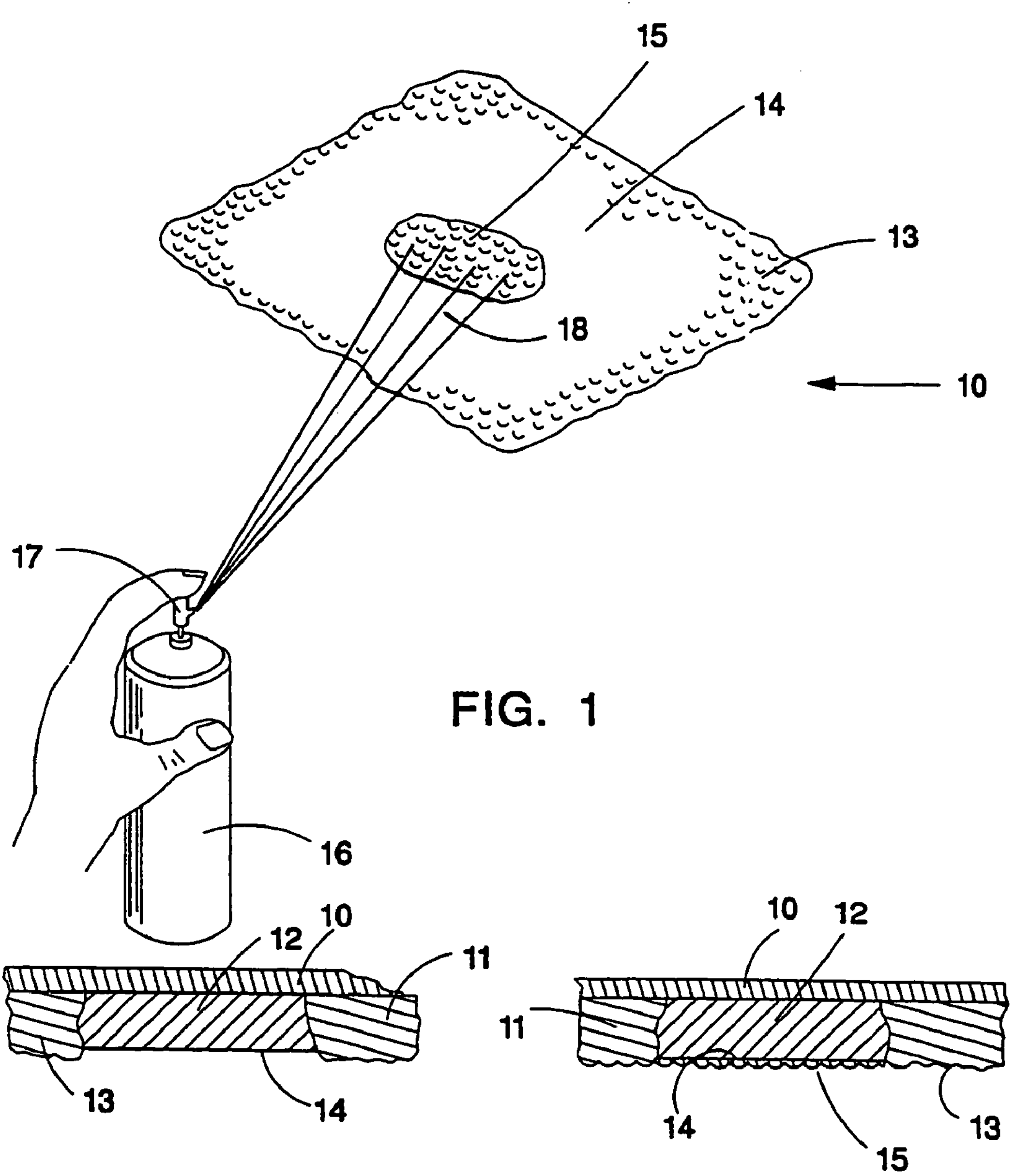
FIG. 1 illustrates the direct application of the spray-on surface texture material from the dispenser for repairing of an acoustic ceiling in accordance with an embodiment of the present invention.
FIG. 2 illustrates a transverse cross-sectional view of the repaired or patched area shown in FIG. 1 showing the dissimilarity in surface texture between the original ceiling surface and the surface of the patched areas.
FIG. 3 illustrates a transverse cross-sectional view of the repaired or patched area on an acoustic ceiling and showing matching of surface texture between the surface of the patch and the surrounding ceiling surface after use of the novel spray-on surface textured material of the present invention.

Referring in detail to FIGS. 2 and 3, a fragmentary view is shown of a typical ceiling support panel or board and is identified by numeral 10. The panel 10 supports textured acoustic material 11 that has been damaged and a repair to the damaged area which takes the form of a patch 12. After curing, the patch becomes solidified and adheres to the edge marginal region of material 11 and surface of the panel 10 defining the area covered by the patch material. The surface texture of the original material 13 can be seen to be broadly defined as being bumpy, pebbled, or presenting a "popcorn" look.

In FIG. 2, it can be seen that the patch 12 displays a smooth surface 14 usually attained by repeatedly drawing the edge of a hand tool, such as a trowel, across the surface. After drying or curing, the material of the patch 12 becomes hard and the surface 14 remains smooth and unmatched with the surrounding irregular or raised surface 13 carried on the panel 10. Although the surface 14 will accept a variety of coatings such as paint or the like in a conventional situation, the surface texture of the coating will not simulate or blend with the surrounding irregular surface 13 of original material 11. Visually, the flat patch area 14 will always be noticeable and indicate the presence of a repair.

Referring now in detail to FIGS. 1 and 3, the surface textured material 15 discharged from a dispenser 16 is illustrated as being applied to the smooth surface 14 of the patch 12. In this connection, a bumpy and irregular surface is placed on the flat surface 14 so as to be compatible with, blend with and be coextensive with the surrounding ceiling surface area 13. By employment of the present invention, the surface texture of both the patch 12 and the surrounding acoustic ceiling material 13 are substantially identical and matched so that no visual indication is presented or noticeable pertaining to a repair or patch. The material being applied is broadly indicated by numeral 15 which is contained within the dispenser container 16 and applied in the form of a spray 18 in either liquid or semi-liquid condition. Application is achieved by depression of a pump or spray nozzle 17 which permits discharge of the pressurized material carried within the container 16. Such an application of the material occurs directly on the desired area 14 by the user who hand-carries the container 16 and operates the nozzle 17 on site with one hand. Waste and loss of material is avoided since the discharge is under the control of the user through the application of the discharge nozzle 17. Therefore, there is no residue or excess material that is not used which requires disposal. Furthermore, the material 15 is lumpy and, after curing on surface 14, provides an irregular surface compatible and matching the surrounding material surface area. Furthermore, the material in the container is considered a finished product and does not require additives of any kind and the labeling on the container may provide identification numbers and laboratory information.

Preferably, an example of the material 15 comprises a liquid base, a filler, an adhesive binder, a propellant, an anti-foaming agent, a suspension agent, and an aggregate comprising rubber or polyethylene particulates. The liquid base may be any aqueous substance such as water and/or a non-aqueous substance such as alcohol, aromatic or aliphatic hydrocarbon, ketone, ester or the like. The filler may be any material that can serve as an extender or bodifier such as limestone, clay, mica, or silica, or similar materials, or a mixture thereof. The filler may also be made of a paint-based material. The adhesive binder is an adhesive that may take the form of a natural polymer, such as gums and resins and the like, or a synthetic polymer, such as polyvinyl alcohol, alkyd resins, etc., or a combination thereof. The adhesive binder will serve to keep the material 15 in place once it has cured. The propellant will act to push or propel the material 15 from the container. The propellant may be hydrocarbon, dimethyl ether, propane, butane, carbon dioxide, nitrogen, compressed gas or any combination of the above said propellants or any other propellant used in the aerosol industry, such as hydrofluorocarbons. However, the propellant is preferably a VOC propellant. The anti-foaming agent is preferably Wichenol™ or Dow Corning Anti-Foam A and B™. The suspension agent is preferably a material such as carbonal. The aggregate is preferably made of rubber particulates or polyethylene particulates, which will not deteriorate or melt in the presence of VOC propellants, and that are incorporated with the other materials to provide the irregular texture to the material 15.

By way of an example, the hardenable flowable material 15 of the present invention may have the following composition by percentage weight:

| | |
|---|---|
| Water/Solvent | 20–70% |
| Filler | 40–80% |
| Binder | 1–50% |
| Aggregate | 2–40% |
| Anti-Foaming Agent | 1–10% |
| Suspension Agent | 1–20% |
| Liquefied Propellant (that mixes with the compound) | 5–20% |

Also by way of a more specific example, the hardenable flowable material 15 of the present invention may have the following basic composition by percentage weight:

| | |
|---|---|
| Calcium-Carbonate, Mica, and Clay | 40–80% |
| Polyvinyl Alcohol | 1–50% |
| Dimethyl Ether | 5–20% |
| Rubber or Polyethylene Particulates | 2–40% |
| Wichenol ™ | 1–10% |
| carbonal | 1–20% |
| Water | Quantity Sufficient to Achieve 100% |

The calcium-carbonate (limestone), mica, and clay of the filler are preferably in powder form. Furthermore, the composition of the material 15, as described directly above, may contain an anti-freeze (1–10%), such as ethylene glycol, or a fungicide (0.05–5%). In addition, in order to adjust the finished appearance of the material 15, an acrylic polymer and/or copolymer may be added in an appropriate amount, which will increase the hardness and body. Further, alcohol and/or solvent may be added to effect faster drying times.

As illustrated in FIG. 1, the material 15 is applied directly to the smooth surface 14 and when dried or cured results in an irregular surface having a texture compatible and matched with the surrounding surface texture of the acoustic ceiling. The patch material 12 is dried and cured in preparation for receiving the material 15, and the adhesive binder included in the material 15 insures adhesion of the material to the patch area. Even if small amounts of the material would extend beyond the surface 14 onto the surrounding material, the surface would still be matched and no unsightly patch edges or dissimilar surface texture would be detectable.

The use rubber particulates or polyethylene particulates as the aggregate allows the hardenable flowable material to be sprayed in the presence of volatile organic compound (VOC) propellants. Other materials, such as STYROFOAM, will deteriorate and melt in the presence of VOC propellants. Therefore, when using materials such as STYROFOAM, one must use compressed air or other non-VOC propellants, which requires an increased pressure to propel these materials. The increased pressure also reduces the desired level of atomization and the level of control for the user when spraying. The increased pressure also forces the sprayable material to be dispensed all at once in a matter of seconds, which offers the user little value. Because rubber particulates or polyethylene particulates are unaffected by VOC propellants, the use of rubber particulates or polyethylene particulates, and particularly open-cell particulates (which provide a better acoustic value), as the aggregate allows for a more controllable and atomized spray texture, making the repair of an acoustic ceiling patch with the use of aerosol dispenser an easier task.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A hardenable flowable substance for application to a patch surface surrounded by an acoustic ceiling material having an irregular surface texture to form a layer of textured patch material on the patch surface, wherein the hardenable flowable substance is storable in a fluid-tight dispensing container and sprayable utilizing a volatile organic compound propellant, the hardenable flowable substance comprising:

- a liquid base;
- a filler selected to form an extender or bodifier for the resulting patch material;
- an adhesive binder selected to adhere the resulting patch material to the surface;
- an aggregate comprising polyethylene particulates, selected to give the resulting patch material an irregular surface texture;
- an anti-foaming agent; and
- a suspension agent consisting essentially of carbonal, wherein the hardenable flowable substance is initially stored in fluid state and is dispensable in the form of an aerosol spray from the fluid-tight container and, after being released and curing, forms a bumpy, irregular surface texture that matches and is compatible with the acoustic ceiling material surrounding the patch, and wherein the aggregate does not decompose in the hardenable flowable substance when stored in the fluid state or dispensed in the aerosol spray.

2. The hardenable flowable substance according to claim 1, having the following composition by percentage weight:

- the liquid base of 20–70%;
- the filler of 40–80%;
- the adhesive binder of 1–50%;
- the propellant of 5–20%;
- the aggregate of 2–40%;
- the anti-foaming agent of 1–10%; and
- the suspension agent of 1–20%.

3. The hardenable flowable substance according to claim 2, wherein:

- the liquid base consists essentially of water;
- the filler consists essentially of a mixture of calcium carbonate and mica;
- the adhesive binder consists essentially of polyvinyl alcohol;
- the propellant consists essentially of dimethyl ether; and
- the polyethylene particulates of the aggregate are open-cell.

4. The hardenable flowable substance according to claim 2, wherein:

- the liquid base consists essentially of a solvent;
- the filler consists essentially of a mixture of calcium carbonate and mica;
- the adhesive binder consists essentially of polyvinyl alcohol;
- the propellant consists essentially of dimethyl ether;
- the polyethylene particulates of the aggregate are open-cell.

5. The hardenable flowable substance according to claim 1, further comprising:

- a fungicide.

6. The hardenable flowable substance according to claim 5, wherein the fungicide as a composition by percentage weight of 0.05–5%.

7. The hardenable flowable substance according to claim 1, further comprising:

- an anti-freeze.

8. The hardenable flowable substance according to claim 7, wherein the anti-freeze consists essentially of ethylene glycol.

9. The hardenable flowable substance according to claim 7, wherein the anti-freeze has a composition by percentage weight of 1–10%.

10. A hardenable flowable substance storable in a fluid-tight dispensing container and sprayable utilizing a volatile organic compound propellant, the hardenable flowable substance comprising:

- a liquid base;
- a filler selected to form an extender or bodifier for the resulting patch material;
- an adhesive binder selected to adhere the resulting patch material to the surface;
- an aggregate comprising polyethylene particulates, selected to give the resulting patch material an irregular surface texture;
- an anti-foaming agent; and
- a suspension agent consisting essentially of carbonal, wherein the hardenable flowable substance is initially stored in fluid state and is dispensable in the form of a mere controllable aerosol spray from the fluid-tight container and, after being released and curing, forms a bumpy, irregular surface texture that matches and is compatible with the acoustic ceiling material surrounding the patch, and wherein the aggregate does not decompose in the hardenable flowable substance when stored in the fluid state or dispensed in the aerosol spray.

11. A hardenable flowable substance for application to a patch surface surrounded by an acoustic ceiling material having an irregular surface texture to form a layer of textured patch material on the patch surface, wherein the hardenable flowable substance is storable in a fluid-tight dispensing container and sprayable utilizing a propellant, the hardenable flowable substance comprising:

a liquid base;

a filler selected to form an extender or bodifier for the resulting patch material;

an adhesive binder selected to adhere the resulting patch material to the surface;

an aggregate selected to give the resulting patch material an irregular surface texture, the aggregate comprising polyethylene particulates;

an anti-foaming agent; and a suspension agent consisting essentially of carbonal, wherein the hardenable flowable substance is initially stored in fluid state and is dispensable in the form of a aerosol spray from the fluid-tight container and, after being released and curing, forms a bumpy, irregular surface texture that matches and is compatible with the acoustic ceiling material surrounding the patch, and wherein the aggregate does not decompose in the hardenable flowable substance when stored in the fluid state or dispensed in the aerosol spray.

12. A hardenable flowable substance for application to a patch surface surrounded by an acoustic ceiling material having an irregular surface texture to form a layer of textured patch material on the patch surface, wherein the hardenable flowable substance is storable in a fluid-tight dispensing container and sprayable utilizing a volatile organic compound propellant, the hardenable flowable substance comprising:

a liquid base;

a filler selected to form an extender or bodifier for the resulting patch material;

an adhesive binder selected to adhere the resulting patch material to the surface;

an aggregate comprising polyethylene particulates that does not decompose in the presence of volatile organic compound propellants, selected to give the resulting patch material an irregular surface texture;

an anti-foaming agent; and a suspension agent comprising carbonal, wherein the hardenable flowable substance is initially stored in fluid state and is dispensable in the form of an aerosol spray from the fluid-tight container and, after being released and curing, forms a bumpy, irregular surface texture that matches and is compatible with the acoustic ceiling material surrounding the patch.

13. The hardenable flowable substance according to claim 12, having the following composition by percentage weight:

the liquid base of 20–70%;

the filler of 40–80%;

the adhesive binder of 1–50%;

the propellant of 5–20%;

the aggregate of 2–40%;

the anti-foaming agent of 1–10%; and the suspension agent of 1–20%.

14. The hardenable flowable substance according to claim 13, wherein:

the liquid base consists essentially of water;

the filler consists essentially of a mixture of calcium carbonate and mica;

the adhesive binder consists essentially of polyvinyl alcohol;

the propellant consists essentially of dimethyl ether;

the polyethylene particulates of the aggregate are open-cell; and the suspension agent consists essentially of carbonal.

15. The hardenable flowable substance according to claim 13, wherein:

the liquid base consists essentially of a solvent;

the filler consists essentially of a mixture of calcium carbonate and mica;

the adhesive binder consists essentially of polyvinyl alcohol;

the propellant consists essentially of dimethyl ether;

the polyethylene particulates of the aggregate are open-cell; and the suspension agent consists essentially of carbonal.

16. The hardenable flowable substance according to claim 12, further comprising:

a fungicide.

17. The hardenable flowable substance according to claim 16, wherein the fungicide as a composition by percentage weight of 0.05–5%.

18. The hardenable flowable substance according to claim 12, further comprising:

an anti-freeze.

19. The hardenable flowable substance according to claim 18, wherein the anti-freeze consists essentially of ethylene glycol.

20. The hardenable flowable substance according to claim 18, wherein the anti-freeze has a composition by percentage weight of 1–10%.

21. A hardenable flowable substance storable in a fluid-tight dispensing container and sprayable utilizing a volatile organic compound propellant, the hardenable flowable substance comprising:

a liquid base;

a filler selected to form an extender or bodifier for the resulting patch material;

an adhesive binder selected to adhere the resulting patch material to the surface;

an aggregate comprising polyethylene particulates that does not decompose in the presence of volatile organic compound propellants, selected to give the resulting patch material an irregular surface texture;

an anti-foaming agent; and a suspension agent comprising carbonal, wherein the hardenable flowable substance is initially stored in fluid state and is dispensable in the form of a controllable aerosol spray from the fluid-tight container and, after being released and curing, forms a bumpy, irregular surface texture that matches and is compatible with the acoustic ceiling material surrounding the patch.

22. A hardenable flowable substance for application to a patch surface surrounded by an acoustic ceiling material having an irregular surface texture to form a layer of textured patch material on the patch surface, wherein the hardenable flowable substance is storable in a fluid-tight dispensing container and sprayable utilizing a propellant, the hardenable flowable substance comprising:

a liquid base;

a filler selected to form an extender or bodifier for the resulting patch material;

an adhesive binder selected to adhere the resulting patch material to the surface;

an aggregate selected to give the resulting patch material an irregular surface texture, the aggregate comprising polyethylene particulates;

an anti-foaming agent; and a suspension agent comprising carbonal, wherein the hardenable flowable substance is initially stored in fluid state and is dispensable in the form of an aerosol spray from the fluid-tight container and, after being released and curing, forms a bumpy, irregular surface texture that matches and is compatible with the acoustic ceiling material surrounding the patch.

* * * * *